(12) United States Patent
Bender et al.

(10) Patent No.: US 10,394,578 B2
(45) Date of Patent: Aug. 27, 2019

(54) INTERNET OF THINGS DEVICE STATE AND INSTRUCTION EXECUTION

(71) Applicant: International Business Machines Corporation, Armonk, NY (US)

(72) Inventors: Michael Bender, Rye Brook, NY (US); Rhonda L. Childress, Austin, TX (US); Rahul Gupta, Bentonville, AR (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 15/411,586

(22) Filed: Jan. 20, 2017

(65) Prior Publication Data
US 2018/0210729 A1 Jul. 26, 2018

(51) Int. Cl.
G06F 9/44 (2018.01)
G06F 9/448 (2018.01)
G06F 21/00 (2013.01)

(52) U.S. Cl.
CPC ............ G06F 9/4498 (2018.02); G06F 21/00 (2013.01)

(58) Field of Classification Search
None
See application file for complete search history.

(56) References Cited

U.S. PATENT DOCUMENTS

| | | | |
|---|---|---|---|
| 7,581,006 B1* | 8/2009 | Lara | H04L 67/1008 709/217 |
| 8,650,965 B2* | 2/2014 | Hashiguchi | B25J 9/0087 73/763 |
| 9,299,029 B1 | 3/2016 | Kim | |
| 9,880,925 B1* | 1/2018 | Bienkowski | G06F 11/3688 |
| 2009/0271077 A1* | 10/2009 | Goodrich | A61G 3/061 701/49 |
| 2010/0274903 A1* | 10/2010 | Wookey | G06F 3/1454 709/227 |
| 2015/0089361 A1* | 3/2015 | Gu | H04N 9/3173 715/702 |
| 2015/0229548 A1 | 8/2015 | Ralston | |
| 2016/0041534 A1 | 2/2016 | Gupta | |
| 2016/0080421 A1 | 3/2016 | Hou | |

(Continued)

FOREIGN PATENT DOCUMENTS

WO WO003038581 5/2003

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Dong U Kim
(74) *Attorney, Agent, or Firm* — Heslin Rothenberg Farley & Mesiti P.C.; Scott Dobson, Esq.

(57) ABSTRACT

A method, computer program product, and system includes a processor(s) intercepting an instruction, upon receipt on the instruction, by the one or more processors in the computing device on a communications network, prior to execution of the instruction by the processor(s) in the computing device. The processor(s) determines a state of the computing device and based on the state of the computing device and a portion of the instruction, the processor(s) determines that the instruction is precluded from executing on the computing device.

16 Claims, 5 Drawing Sheets

(56) References Cited

U.S. PATENT DOCUMENTS

2016/0094386 A1     3/2016   Kaufman
2016/0205538 A1     7/2016   Kweon
2018/0063133 A1*   3/2018   Zhang ................. H04L 63/0876

OTHER PUBLICATIONS

Gerrit Niezen, "Ontologies for Interaction—Enabling Serendipitous Interoperability in Smart Environments", (see section 4.4.3 Device States, p. 74).

* cited by examiner

INTERNET OF THINGS DEVICE STATE AND INSTRUCTION EXECUTION

BACKGROUND

The Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. Because the smart sensors carry unique identifiers, a computing system that communicates with a given sensor can identify the source of the information. Within the IoT, various devices can communicate with each other and can access data from sources available over various communication networks, including the Internet.

SUMMARY

Shortcomings of the prior art are overcome and additional advantages are provided through the provision of a method for precluding an instruction from executing on a computing device. The method includes, for instance: intercepting, by the one or more processors in a computing device, an instruction, upon receipt on the instruction, by the one or more processors in the computing device on a communications network, prior to execution of the instruction by the one or more processors in the computing device; determining, by the one or more processors, a state of the computing device; and based on the state of the computing device and a portion of the instruction, determining, by the one or more processors, that the instruction is precluded from executing on the computing device.

Shortcomings of the prior art are overcome and additional advantages are provided through the provision of a computer program product for precluding an instruction from executing on a computing device. The computer program product comprises a storage medium readable by a processing circuit and storing instructions for execution by the processing circuit for performing a method. The method includes, for instance: intercepting, by the one or more processors in a computing device, an instruction, upon receipt on the instruction, by the one or more processors in the computing device on a communications network, prior to execution of the instruction by the one or more processors in the computing device; determining, by the one or more processors, a state of the computing device; and based on the state of the computing device and a portion of the instruction, determining, by the one or more processors, that the instruction is precluded from executing on the computing device.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
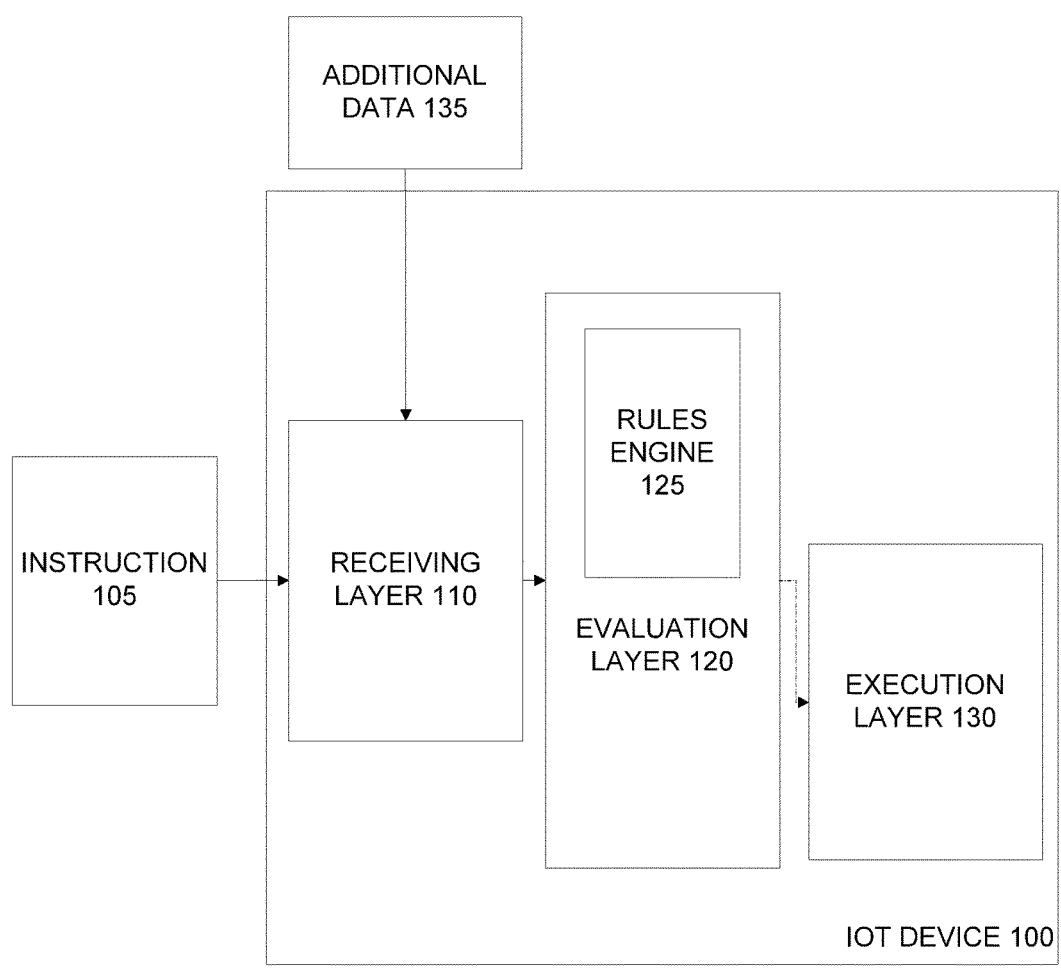
FIG. 1 is a physical environment illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 3:
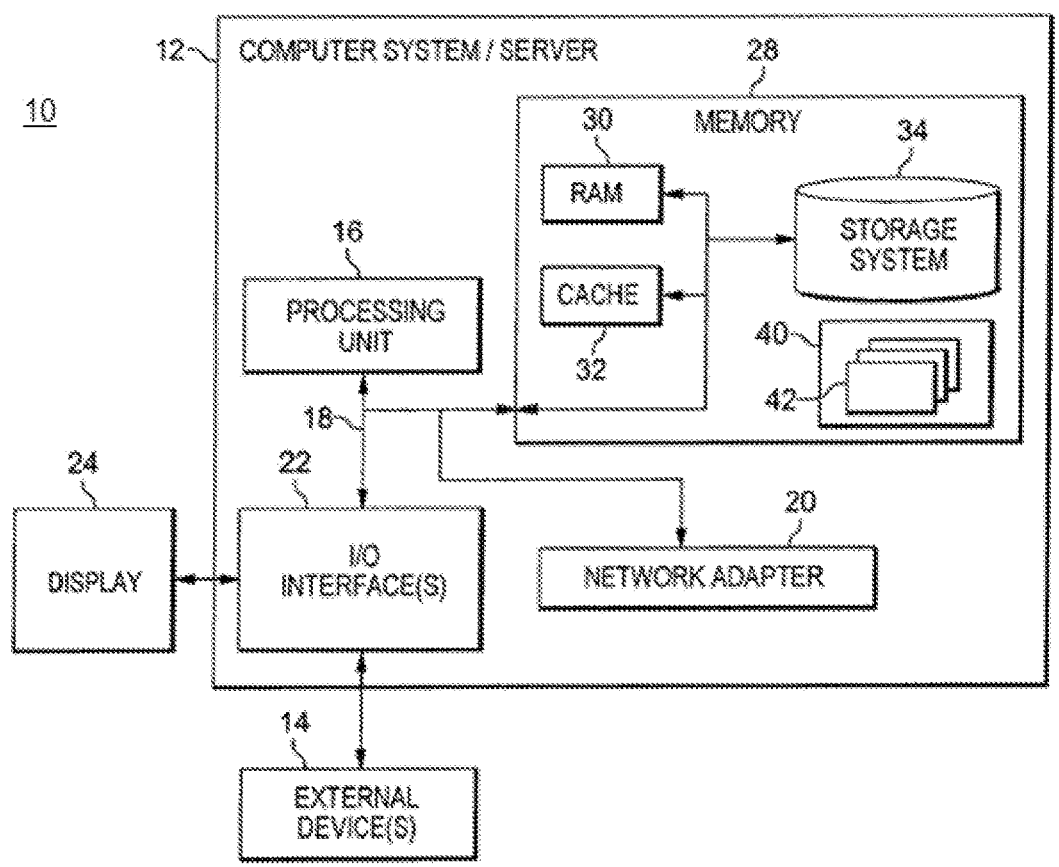
FIG. 3 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 3 as program/utility 40, having a set (at least one) of program modules 42, may be stored in memory 28.

Embodiments of the present invention provide a computer-implemented method, system, and computer program product that include one or more programs, executed by at least one processor, for evaluating instructions received by an IoT device to determine, based on the state of the device, whether the instructions should be executed. In some embodiments of the present invention, the one or more programs may execute on the IoT device itself. In other embodiments of the present invention, the one or more programs execute on a device in communication with the IoT device. For example, a group of IoT devices may receive data regarding whether to execute a given instruction from a central service. For illustrative purposes, aspects of embodiments of the present invention can be envisioned as an evaluation layer that operates as an intermediary between when an IoT device receives an instruction and when the IoT device executes the instruction.

An advantage of certain aspects of embodiments of the present invention is that by effectively creating an intermediate (e.g., evaluation) layer between receipt of instructions and execution of instructions in an IoT device, the one or more programs in embodiments of the present invention that evaluate each received instruction protect a device from taking actions at times where those actions would be detrimental, but do enable these same actions at other times. Therefore, the efficacy and reliability of a given IoT device is increased because of this safeguard. This advantage is inextricably tied to computing at least because this aspect improves the functionality of an IoT device by implementing specific functionality that evaluates the effect of instructions on a given device and enables execution of the instruction at appropriate times. By evaluating instructions in accordance with a hierarchy of rules, one or more programs in embodiments of the present invention enable a given IoT device to execute certain commands, at certain time, but will not enable that device to execute other commands, at other times. Aspects of embodiments of the present invention constitute an improvement in device security because the added processing from receipt to execution of a given instruction provides a security advantage that serves to limit hacking of IoT devices.

Some embodiments of the present invention provide certain advantages over existing systems related to IoT devices. For example, certain systems that relate to the functionality of IoT devices are limited to gathering input from other devices that share the same subscriber (phone) number. Embodiments of the present invention can take input from multiple devices and multiple types of devices, and one or more programs executing on a given IoT device can utilize these inputs when deciding whether to limit actions based on the current state of the IoT device. Some embodiments of the present invention can be installed as standalone systems to set states of devices and subsequently limit execution of instructions based on the state, while existing systems related to IoT devices rely upon multiple sources and do not include standalone embodiments or functionality. Certain embodiments of the present invention provide security advantages over existing IoT control systems because these embodiments enable the changing of an IoT device state exclusively through one or more programs executing on the IoT device on in an isolated portion of the device to which access is limited (e.g., a device change module). Additionally, in embodiments of the present invention, rather than a device state triggering an action, based on the state, one or more programs prevent actions from being executed.

FIG. 1 is a diagram that illustrates certain aspects of embodiments of the present invention. In this figure, certain functionality is attributed to certain portions (e.g., layers) of embodiments of the present invention. However, this separation of functionality is offered merely for illustrative purposes and not to limit the structure of an implementation of an embodiment of the present invention.

As seen in FIG. 1, in an IoT device 100, one or more programs that evaluate an instruction 105 received by the IoT device 100, form an evaluation layer 120. In an embodiment of the present invention, one or more programs of an evaluation layer 120 intercept an instruction 105 upon receipt (e.g., by program code in a receiving layer 110) and prior to execution of the instruction (e.g., by program code in an execution layer 130).

As illustrated in FIG. 1, in the IoT device 100, one or more programs characterized for illustrative purposes as a receiving layer 110, receive an instruction 105 (or more than one instruction), and pass this instruction to one or more programs in the evaluation layer 120. The one or more programs in the evaluation layer 120 determine whether the instruction should be executed by the IoT device. If the one or more programs in the evaluation layer 120 determine that the instruction 105 should be executed, the one or more programs in the evaluation layer 120 pass the instruction 105 to one or more programs in an execution layer 130, for execution. If the one or more programs in the evaluation layer 120 determine that the instruction 105 should not be executed, the one or more programs in the evaluation layer 120 can reject the instruction 105, delete the instruction 105, or queue the instruction 105 for future execution, or to provide log data. Although in FIG. 1, the evaluation layer 120 is portrayed as being on an IoT device, in some embodiments of the present invention, the decision-making, which is illustrated in FIG. 1 as occurring on the device 100, in the evaluation layer 120, can occur remotely from the device 100, with the resultant decision regarding whether to execute an instruction 105 being transmitted to the device 100, as input from a central service (not pictured).

In embodiments of the present invention, the one or more programs in the evaluation layer 120 (or one or more programs that are part of a central service) determine whether to allow the instruction to execute in the IoT device 100 based on a number of factors, including but not limited to, the instruction itself, the parameters of the IoT device, the state of the IoT device, and/or the state of a second IoT device or other computing resource in communication with the IoT device.

In an embodiment of the present invention, the one or more programs can additionally set an IoT device 100 to a given state. When the device is in the given state, the one or more programs in the evaluation layer 120 determine whether to enable an instruction 105 to execute based on the state. By setting a device to a given state, the one or more programs prevent the execution/processing of certain instructions/actions on the device, for the duration of the time that the device is in the given state. In an embodiment of the present invention, one or more programs (e.g., in the evaluation layer 120) can limit the actions the device takes (e.g., the commands and instructions that the device executes), based on the state of the device. Thus, the one or more programs may or may not pass an instruction 105 to be executed (e.g., at the execution layer 130) based on the device state. The one or more programs may set the IoT device 100 to a given state based on receiving data from various sources, including but not limited to: one or more IoT devices and/or a website/interface (e.g., weather, traffic). While in this state, the one or more programs may reject certain types of instructions 105 and/or commands.

In embodiments of the present invention, the one or more programs in the evaluation layer 120 include a rules engine 125. In FIG. 1, the rules engine 125 is pictured as located on the device itself, however, in additional embodiments of the present invention, some or all of the contents of the rules engine 125 are not located on the IoT device 100 itself but are accessible to the device 100 over a communications connection.

Returning to FIG. 1, the program code in the evaluation layer 120 utilizes the rules engine 125, which includes a hierarchy of rules, to determine which instructions 105 (e.g., commands) can be executed when the device 100 is in a given state, and which instructions 105 cannot be executed when the device 100 is in the given state. Thus, based on the rules engine 125, the one or more programs allow the device 100 to execute certain commands (e.g., by passing them to the execution layer 130), but not others, while queuing and/or ignoring rejected/ignored commands. In some embodiments of the present invention, the rule based engine 125 stores the state of an IoT device 100 and the state is changed exclusively in the rule based engine 125. In another embodiment of the present invention, the rules based engine 125 on the device 100 is the only place that a state can be changed, though it can be stored elsewhere in the IoT device 100 or in a memory external to but accessible to the device 100. Limiting the access to a state of the device 100, and the ability to change the state, is a deterrent to and safeguard against hacking.

In some embodiments of the present invention, the rules engine 125 may include rules conditioned upon additional data 135 available from other IoT devices and/or other computing nodes accessible from the IoT device 100. For example, an IoT device 100 is a blind on a window in a day mode or state. The rules engine 125 dictates that in this state, the blind remains open unless sunlight hitting the window exceeds a certain intensity. Thus, when this IoT device 100 receives an instruction 105 to close the blind (i.e., shift to a closed position), based on determining that the IoT device 100 is in day mode, the one or more programs in the evaluation layer 120 determine whether to execute the instruction. The one or more programs make this determination in part based upon the sunlight intensity level, which the one or more programs can obtain from a smart sensor on the window. If the sunlight does not exceed the certain intensity, the evaluation layer 120 rejects the instruction 105.

Sources for additional information for use by the rules engine 125 may also include websites and another example of a type of additional data 135 is weather information. In some embodiments of the present invention, the additional data 135 utilized by the rules engine 125 may include an externally provided list of overrides that can be incorporated into the rule based engine. In an embodiment of the present invention, one or more programs obtains, as a service, additional information that includes a list of instructions to reject. Because the device in an IoT device 100, it can utilize data collected by customized and strategically placed sensors, as well as communications between computing devices over a communications network, such as the Internet. Thus, embodiments of the present invention use IoT sensors to gather data.

As aforementioned, IoT devices refer to computing devices that form the IoT, which is a system of interrelated computing devices, mechanical and digital machines, objects, animals and/or people that are provided with unique identifiers and the ability to transfer data over a network, without requiring human-to-human or human-to-computer interaction. Aspects of embodiments of the present invention may prove particularly useful to certain types of IoT devices. For example, an IoT device may be the braking interface in an automobile. This automobile may be operating at a high speed, for example, at seventy (70) miles per hour, and the braking interface, e.g., the IoT device 100, may receive an instruction 105 to brake, e.g., at a receiving layer 110. However, one or more programs, e.g., the evaluation layer 120, received data from one or more other IoT devices indicating that the weather conditions are not clear and that the roads are slick. As aforementioned, IoT devices includes sensors which can provide this type of environmental information either automatically or upon being polled by one or more programs in the IoT device 100. Based on receiving this information, in some embodiments of the present invention, the one or more programs place the braking interface in a state where emergency braking is disabled, based on the environmental information, as emergency braking could be dangerous given these conditions. Thus, should the braking interface receive an instruction 105 to brake while this IoT device 100 is in this state, one or more programs in the evaluation layer 120 would reject this instruction 105. An instructions to a braking system that is an IoT device 100 could come from a device that is external to the vehicle with this braking system and could be sent for nefarious purposes. Thus, by placing the braking system in a state that renders the vehicle unresponsive to emergency braking request that would endanger the vehicle and the safety of those in the vehicle, the present invention enhances the security of the vehicle.

Embodiments of the present invention can also be integrated into personal healthcare systems. For example, an IoT device 100 may include an insulin pump. With this device, the best interests of a patient dictate that the pump should provide insulin to the patient at a consistent rate and uninterrupted, provided that glucose levels of the patient remain in a given range. Thus, in this embodiment of the present invention, one or more programs in the insulin pump IoT device 100 receive continuous glucose readings, and based on the consistency of these readings, place and maintain the IoT device 100 in a mode in which insulin is administered continuously and at a consistent rate. While the insulin pump remains in this state, when one or more programs receive an instruction 105 to change the operation of the pump, one or more programs (e.g., the evaluation layer 120) executing on the IoT device 100 reject this instruction 105 and/or queue the instruction 105 for execution when the IoT device 105 is in a state that is compatible with executing this instruction 105.

Figure 2:
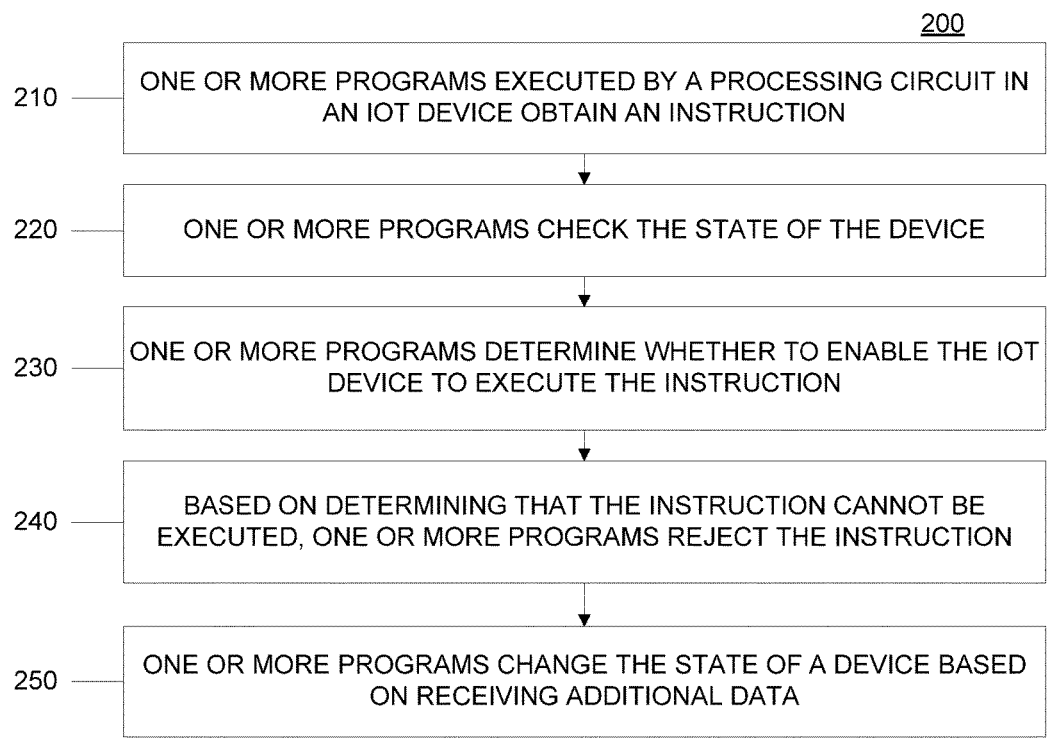
FIG. 2 is a workflow illustrating certain aspects of an embodiment of the present invention.

FIG. 2 is a workflow 200 of aspects of some embodiments of the present invention. In an embodiment of the present invention, one or more programs executed by a processing circuit in an IoT device obtain an instruction (210). The instruction may be the result of a manual input into the device by a user or it may be received over a network, such as the Internet, from another computing node, including but not limited to, one or more additional IoT device(s).

The one or more programs check the state of the device (220). In an embodiment of the present invention, the device state may be maintained in a module and/or memory resident on the physical IoT device, in order to limit the ability to change the state. In an embodiment of the present invention, the one or more programs are the only programs that are authorized to access the state and/or change the state.

Based on the state of the device, the one or more programs determine whether to enable the IoT device to execute the instruction (230). As explained above, the one or more programs may make this determination based on a hierarchy of rules available on the IoT device, as well as based on additional information. The nature of the additional information is discussed above. In an embodiment of the present invention, one or more programs configure the IoT device with a set of predefined rules and the one or more programs determine whether to enable the IoT device to execute the instruction (230), based on these pre-defined rules. The one or more programs can configure the rules on the IoT device itself and/or in a separate database that is accessible to the one or more programs determining whether to execute an instruction (230).

Based on determining that the instruction cannot be executed by the IoT device (e.g., at the requested time), the one or more programs reject the instruction (240). In an embodiment of the present invention, the one or more programs notify the originator of the instruction that the instruction did not execute. In an embodiment of the present invention, rather than rejecting the instruction, the one or more programs may queue the instruction, for later execution, for example, should the one or more programs modify the state and the new state does not preclude execution of the instruction. In this situation, the one or more program may notify the originator of the instruction of the delay.

In an embodiment of the present invention, certain instructions that are precluded by the state of a given IoT device, can be enabled by the one or more programs, provided that the instructions are resident among a list of overrides. In an embodiment of the present invention, the one or more programs receive a list of overrides as a service and can continuously update data regarding overrides that is used in deciding whether a given instruction can execute when the IoT device is in a given state.

Returning to FIG. 2, in certain an embodiments of the present invention, one or more programs change the state of a device based on receiving additional data (250). In an embodiment of the present invention, the state is stored in a module on the device itself and is changed on the device itself, by the one or more programs. Provided that the one or more programs queued rejected instructions, based on the state change, the one or more programs may evaluate each queued instruction and decide which can be executed, based on the new state. Returning to the example of a braking system, an initial device state causes the one or more programs to reject instructions for emergency braking, at a given speed. The one or more programs set this initial state based on receiving data from other IoT devices or computing nodes indicating dangerous road conditions. Based on the one or more programs subsequently receiving information regarding favorable changes in the road conditions, the one or more programs may modify the state of the device. In the new state, the one or more programs enable emergency braking instructions.

In certain embodiments of the present invention, a user shifts the state of a device using voice commands. For example, when an IoT device is in a state transition freeze, a user records various commands. When the state of the device is no longer frozen, the recorded commands transition the IoT device to a new state.

Referring now to FIG. 3, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the IoT device 100 (FIG. 1), can be understood as cloud computing node 10 (FIG. 3) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
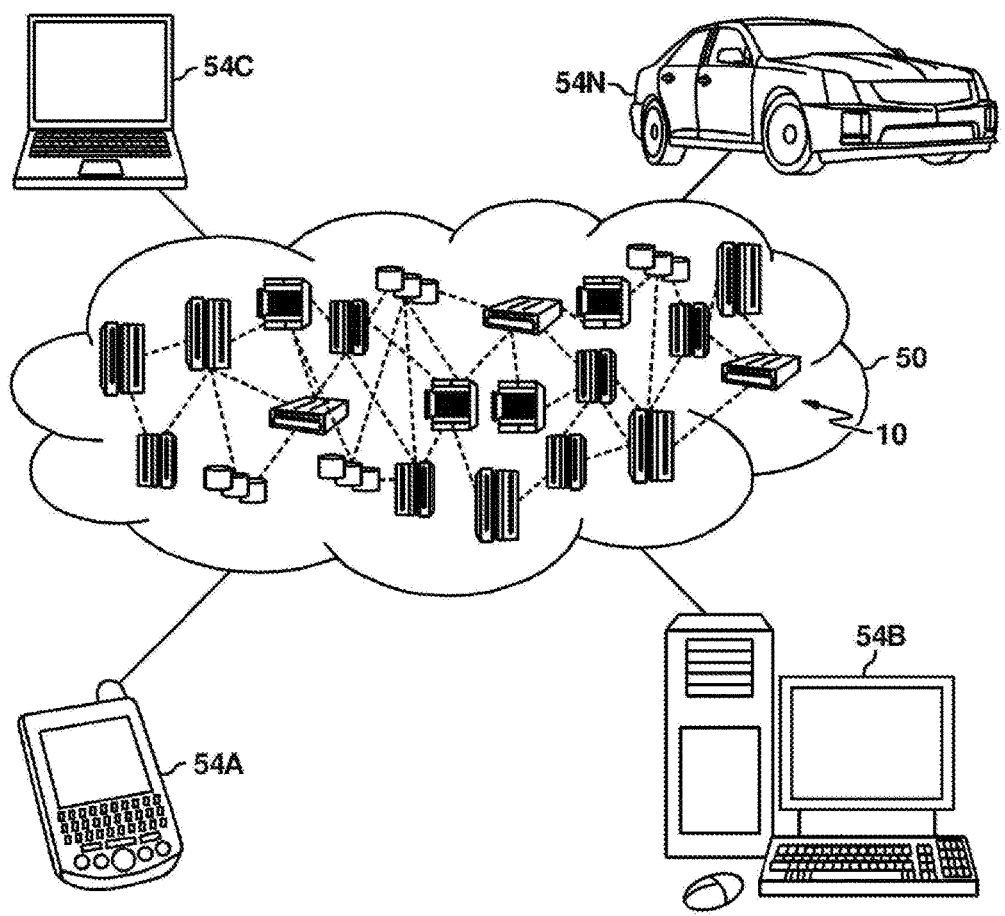
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
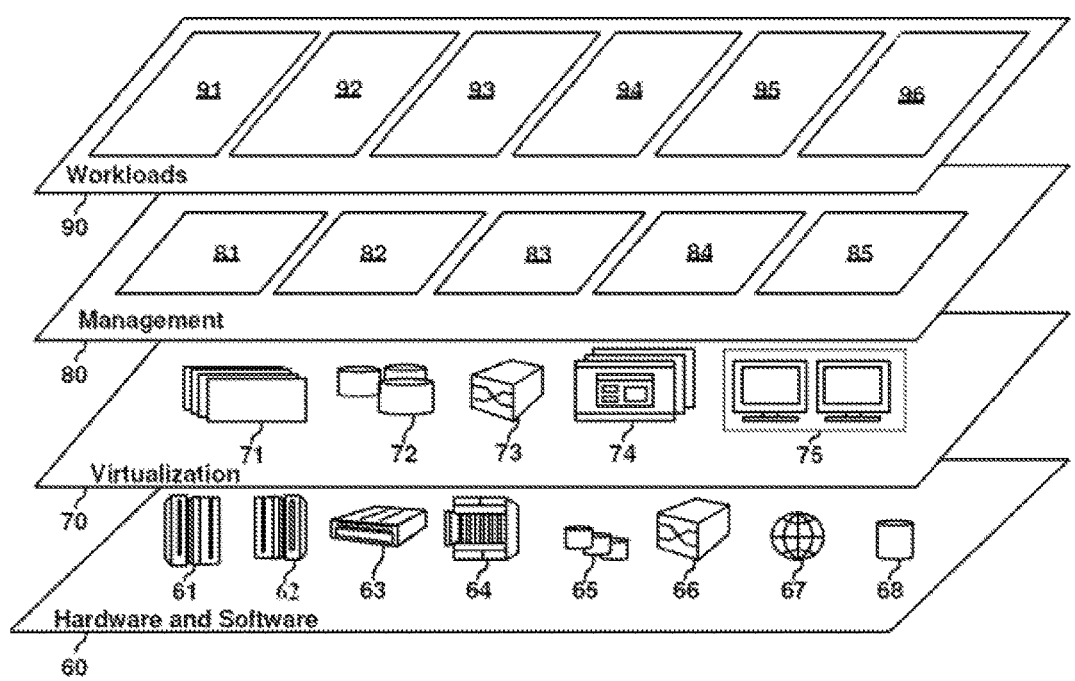
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rejecting an instruction 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    intercepting, by one or more processors in a computing device, an instruction, upon receipt on the instruction, by the one or more processors in the computing device on a communications network, via the communications network, prior to execution of the instruction by the one or more processors in the computing device, wherein the computing device comprises an Internet of Things computing device;
    determining, by the one or more processors, a state of the computing device is a first state, wherein the state of the computing device is accessible only to the one or more processors;
    based on the computing device being in the first state and a portion of the instruction, determining, by the one or more processors, that the instruction is precluded from executing on the computing device, wherein the determining the instruction is precluded from executing on the computing device further comprises:
        mapping, by the one or more processors, the first state to a hierarchy of rules stored on a memory comprising a rule based engine in the computing device; and
        determining, by the one or more processors, that the hierarchy of the rules precludes execution of the instruction when the computing device is in the first state;
    based on the determining that the hierarchy of the rules precludes execution of the instruction, queuing, by the one or more processors, the instruction on a memory in the computing device while the computing device is in the first state;
    changing, by the one or more processors, the state of the computing device from the first state to a second state, wherein the state is changed exclusively in the rule based engine by the one or more processors;
    based on the computing device being in the second state and a portion of the instruction, determining, by the one or more processors, that the queued instruction is allowed to execute on the computing device; and
    automatically transmitting, by the one or more processors, the queued instruction, from the memory, for execution on the computing device, wherein the queued instruction is executed upon receipt from the transmitting.

2. The computer-implemented method of claim 1, wherein the hierarchy of rules is only accessible to processes executed on the one or more processors of the computing device.

3. The computer-implemented method of claim 1, further comprising:
    setting, by the one or more processors, the state of the computing device to the first state, wherein the setting comprises:
        receiving, by the one or more processors, from a portion of a system of interrelated computing devices, mechanical machines, digital machines, and objects comprising smart sensors, communicatively coupled to the computing device over the communications network, data defining conditions impacting viability of the computing device; and configuring, by the one or more processors, the state of the computing device to the first state, in the rule based engine, to mitigate an effect of the conditions on the viability of computing device, wherein the state of the computing device maps to a rules hierarchy defining instructions precluded from execution, when the computing device is in the first state.

4. The computer-implemented method of claim 1, wherein determining the change in the state of the computing device from the first state to a second state comprises:
receiving, by the one or more processors, from a portion of a system of interrelated computing devices, mechanical machines, digital machines, and objects comprising smart sensors, data defining conditions impacting viability of the computing device; and
re-configuring, by the one or more processors, the state of the computing device to set a new state in the rule based engine, wherein the new state is the second state, wherein the new state mitigates an effect of the conditions on the viability of computing device, wherein the new state of the computing device maps to a rules hierarchy defining instructions precluded from execution, when the computing device is in the first state.

5. The computer-implemented method of claim 4, wherein determining that the queued instruction is allowed to execute on the computing device further comprises:
based on the new state of the computing device and a portion of the queued instruction, determining, by the one or more processors, that the queued instruction is not precluded from executing on the computing device.

6. The computer-implemented method of claim 4, wherein the receiving the data defining conditions impacting viability of the computing device comprises receiving the data intermittently, in a service executing on the communications network.

7. The computer-implemented method of claim 6, wherein the data defining conditions impacting viability of the computing device comprises data received from other Internet of Things devices and the conditions comprise conditions external to the computing device.

8. The computer-implemented method of claim 1, further comprising:
identifying, by the one or more processors, an originator of the instruction; and
notifying, by the one or more processors, the originator of the instruction of a delay in executing the instruction based on the computing device being in the first state.

9. The computer-implemented method of claim 1, wherein the determining the queued instruction is allowed to execute on the computing device further comprises:
mapping, by the one or more processors, the second state to a hierarchy of rules stored on a memory in the computing device; and
determining, by the one or more processors, that the hierarchy of the rules allows execution of the queued instruction when the computing device is in the second state.

10. The computer-implemented method of claim 1, wherein the hierarchy of rules stored on a memory comprising a rule based engine in the computing device comprises an externally provided list of overrides incorporated into the rule based engine, and wherein determining that the hierarchy of the rules precludes execution of the instruction when the computing device is in the first state further comprises verifying that the instruction does not match any of the overrides.

11. A computer program product comprising:
a computer readable storage medium readable by one or more processors and storing instructions for execution by the one or more processors for performing a method comprising:
intercepting, by the one or more processors in a computing device, an instruction, upon receipt on the instruction, by the one or more processors in the computing device on a communications network, via the communications network, prior to execution of the instruction by the one or more processors in the computing device, wherein the computing device comprises an Internet of Things computing device;
determining, by the one or more processors, a state of the computing device is a first state, wherein the state of the computing device is accessible only to the one or more processors;
based on the computing device being in the first state and a portion of the instruction, determining, by the one or more processors, that the instruction is precluded from executing on the computing device, wherein the determining the instruction is precluded from executing on the computing device further comprises:
mapping, by the one or more processors, the first state to a hierarchy of rules stored on a memory comprising a rule based engine in the computing device; and
determining, by the one or more processors, that the hierarchy of the rules precludes execution of the instruction when the computing device is in the first state:
based on the determining that the hierarchy of the rules precludes execution of the instruction, queuing, by the one or more processors, the instruction on a memory in the computing device while the computing device is in the first state;
changing, by the one or more processors, the state of the computing device from the first state to a second state, wherein the state is changed exclusively in the rule based engine by the one or more processors;
based on the computing device being in the second state and a portion of the instruction, determining, by the one or more processors, that the queued instruction is allowed to execute on the computing device; and
automatically transmitting, by the one or more processors, the queued instruction, from the memory, for execution on the computing device, wherein the queued instruction is executed upon receipt from the transmitting.

12. The computer program product of claim 11, wherein the hierarchy of rules is only accessible to processes executed on the one or more processors of the computing device.

13. The computer program product of claim 11, the method further comprising:
setting, by the one or more processors, the state of the computing device to the first state, wherein the setting comprises:
receiving, by the one or more processors, from a portion of a system of interrelated computing devices, mechanical machines, digital machines, and objects comprising smart sensors, communicatively coupled to the computing device over the communications network, data defining conditions impacting viability of the computing device; and configuring, by the one or more processors, the state of the computing device to the first state, in the rule based engine, to mitigate an effect of the conditions on the viability of computing device, wherein the state of the computing device maps to a rules hierarchy defining instructions precluded from execution, when the computing device is in the first state.

14. The computer program product of claim 11, wherein determining the change in the state of the computing device from the first state to a second state comprises:

receiving, by the one or more processors, from a portion of a system of interrelated computing devices, mechanical machines, digital machines, and objects comprising smart sensors, data defining conditions impacting viability of the computing device; and re-configuring, by the one or more processors, the state of the computing device to set a new state in the rule based engine, wherein the new state is the second state, wherein the new state mitigates an effect of the conditions on the viability of computing device, wherein the new state of the computing device maps to a rules hierarchy defining instructions precluded from execution, when the computing device is in the first state.

15. The computer program product of claim 14, wherein determining that the queued instruction is allowed to execute on the computing device further comprises:

based on the new state of the computing device and a portion of the queued instruction, determining, by the one or more processors, that the queued instruction is not precluded from executing on the computing device.

16. A system comprising:

a memory in a computing device;

one or more processors in the computing device, in communication with the memory; and program instructions executable by the one or more processors via the memory to perform a method, the method comprising:

intercepting, by the one or more processors in the computing device, an instruction, upon receipt on the instruction, by the one or more processors in the computing device on a communications network, via the communications network, prior to execution of the instruction by the one or more processors in the computing device, wherein the computing device comprises an Internet of Things computing device;

determining, by the one or more processors, a state of the computing device is a first state, wherein the state of the computing device is accessible only to the one or more processors;

based on the computing device being in the first state and a portion of the instruction, determining, by the one or more processors, that the instruction is precluded from executing on the computing device, wherein the determining the instruction is precluded from executing on the computing device further comprises:

mapping, by the one or more processors, the first state to a hierarchy of rules stored in the memory, wherein the memory comprises a rule based engine in the computing device; and determining, by the one or more processors, that the hierarchy of the rules precludes execution of the instruction when the computing device is in the first state;

based on the determining that the hierarchy of the rules precludes execution of the instruction, queuing, by the one or more processors, the instruction on a memory in the computing device while the computing device is in the first state;

changing, by the one or more processors, the state of the computing device from the first state to a second state, wherein the state is changed exclusively in the rule based engine by the one or more processors;

based on the computing device being in the second state and a portion of the instruction, determining, by the one or more processors, that the queued instruction is allowed to execute on the computing device; and automatically transmitting, by the one or more processors, the queued instruction, from the memory, for execution on the computing device, wherein the queued instruction is executed upon receipt from the transmitting.

* * * * *